United States Patent [19]

Kim et al.

[11] Patent Number: 5,703,750
[45] Date of Patent: Dec. 30, 1997

[54] PROPORTIONAL SOLENOID VALVE CONTROL SYSTEM

[75] Inventors: Yong-ho Kim, Seoul; Young-sik Lee, Kyonggi-do; Hee Chun, Seoul, all of Rep. of Korea

[73] Assignee: Samsung Electronics Co., Ltd., Suwon, Rep. of Korea

[21] Appl. No.: 637,078

[22] Filed: Apr. 24, 1996

[30] Foreign Application Priority Data

Sep. 14, 1995 [KR] Rep. of Korea ............ 95-30117

[51] Int. Cl.⁶ .................................................. H01H 47/28
[52] U.S. Cl. ............................................. 361/187; 361/160
[58] Field of Search ............................... 361/160, 187, 361/170; 318/432; 323/283

[56] References Cited

U.S. PATENT DOCUMENTS

| 5,287,243 | 2/1994 | Hu ............................. 361/187 |
| 5,541,806 | 7/1996 | Hoffman ..................... 361/160 |

Primary Examiner—Jeffrey A. Gaffin
Assistant Examiner—Sally C. Medley
Attorney, Agent, or Firm—Cushman Darby & Cushman IP Group of Pillsbury Madison & Sutro LLP

[57] ABSTRACT

A proportional solenoid valve control system limits the current flowing in a solenoid valve if the command current is higher than a fixed value which can be set by a user. A current command limiting circuit limits the current command by providing a fixed value as an output when a current command exceeds the predetermined level.

14 Claims, 4 Drawing Sheets

PROPORTIONAL SOLENOID VALVE CONTROL SYSTEM

BACKGROUND OF THE INVENTION

1. Field of the Invention

The present invention relates to a proportional solenoid valve control system used with, for example, a hydraulic system in a piece of heavy equipment, an automatic transmission system, or a fuel injection system for a vehicle. In particular, this invention relates to a control system for use with an one-way valve in a hydraulic system.

2. Description of the Related Art

Proportional solenoid valves were developed to fill the gap between servovalves and conventional on/off solenoid valves. A description of a proportional solenoid valve may be found in *Machine Design*, pp. 69–72, February 1983, and an option for hydraulic system control is described in *Machine Design*, pp. 77–81, March 1984.

An electronically controlled proportional solenoid valve can proportionally control a hydraulic system, unlike an on/off solenoid valve, and has a lower cost and more simple control system than a servovalve. In particular, while a servovalve has a minimal deadband and a faster response time and frequency response, it is approximately five times more expensive than a proportional solenoid valve. Likewise, while an on/off solenoid valve costs only about half as much as a proportional solenoid valve, it can only control the on/off operation of a hydraulic system.

It is therefore desirable for a proportional solenoid valve to have control performance comparable to that of a servovalve without the concomitant cost.

SUMMARY OF THE INVENTION

An object of the present invention is to provide a proportional solenoid valve control system which precisely controls the current flowing in the proportional solenoid valve according to a current command. Another object of the present invention is to provide a proportional solenoid valve which limits a current command if an external current command higher than a fixed value is applied to the control circuit.

In order to achieve these objects, the proportional solenoid valve control system of this invention includes a current command detection circuit for detecting a differential voltage between a current command input by an user and a reference voltage. An offset circuit transmits the current command detected by the current command detection circuit and generates an offset value which can be varied by user and may be used to limit the current command when the current command is higher than a predetermined level. A current command adding and limiting circuit is provided which adds the current command and the offset value from the offset circuit, and limits the current command by providing a fixed value as an output when the offset value is used to limit the current command. A current detection circuit is provided which detects current flowing in a valve in the main circuitry. A proportional-integrator controller (hereinafter referred to as a PI controller) receives a triangular pulse signal alternating between a positive value and a negative value, and adds the output signal from the current command adding and limiting circuit, the output signal of the current detection circuit, and the second triangular pulse signal, and amplifies an error determined from the three signals. A pulse width modulation comparator receives a different triangular pulse signal and compares it with the output signal of the PI controller. An output circuit generates a switching signal having a duty ratio corresponding to the output signal of the pulse width modulation comparator.

The proportional solenoid valve control system further includes a current command mode determining circuit which determines an operating mode and provides the operating mode to the output circuit.

A switching element uses this switching signal to control the opening or closing operation of the proportional valve connected to the switching element. In this fashion, pulse width modulation is used to control the proportional solenoid valve while reducing power consumption.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

Figure 1:
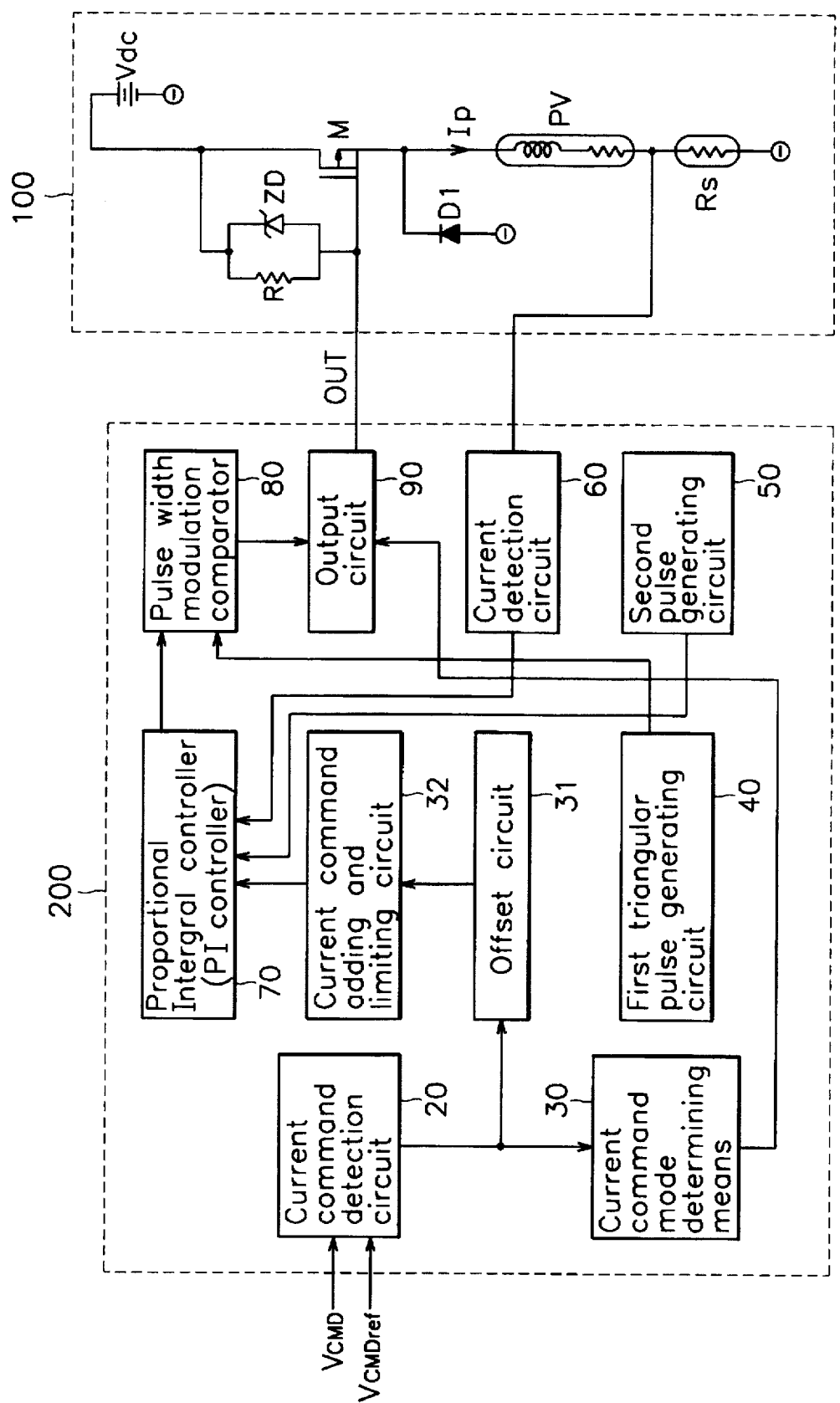
FIG. 1 is a block diagram of a proportional solenoid valve control system in accordance with a preferred embodiment of the present invention.

A proportional solenoid valve control system according to a preferred embodiment of the present invention will now be described with reference to FIG. 1.

The proportional solenoid valve control system according to a preferred embodiment of the present invention includes main circuitry 100 and control circuit 200. The main circuitry 100 includes a P-type metal-oxide semiconductor (hereinafter referred to as a PMOS) transistor M, a proportional solenoid valve PV and a current detection resistor Rs.

In particular, a gate terminal of the PMOS transistor M is connected to the output terminal OUT of the control circuit 200, and a source terminal of the PMOS transistor M is connected to the supply voltage $V_{dc}$. A zener diode ZD having a forward direction and a resistor R are connected in parallel between the gate terminal and the source terminal of the PMOS transistor M.

The proportional solenoid valve PV and a current detection resistor Rs are connected in serial to the drain terminal of the PMOS transistor M. Also, a diode D1 having a reverse direction is connected to the drain terminal of the PMOS transistor M.

The control circuit 200 includes a power-supply circuit 10 (not shown). A current command detection circuit 20 receives a current command $V_{CMD}$ and a reference voltage $V_{CMDref}$ as inputs, and outputs a signal to a current command mode determining device 30 and an offset circuit 31. An output terminal of the current command mode determining device 30 is connected to the output circuit 90. An output from the Offset circuit connected to a current command adding and limiting circuit 32.

A PI controller 70 receives an output signal from the current command adding and limiting circuit 32, an output signal from a second triangular pulse generating circuit 50 and an output signal from a current detection circuit 60, which receives an input from the main circuitry 100.

A pulse width modulation comparator 80 receives an output signal from the PI controller 70 and an output from first triangular pulse generating circuit 40, and outputs a signal which is connected to the output circuit The output circuit 90 outputs a switching signal which is connected to the gate terminal of the PMOS transistor M of the main circuitry 100 to thereby control the switching of the PMOS transistor M. That is, the opening and closing speeds of the PMOS transistor M are controlled by a duty ratio of the switching signal, and a current Ip flowing through a drain of the PMOS transistor M is determined in proportion to the opening and closing speeds of the PMOS transistor M.

The proportional solenoid valve PV is operated according to the current Ip flowing through the PMOS transistor M. The opening and closing degrees are proportional to the proportional solenoid valve PV. The current detection resistor Rs detects the current Ip flowing in the proportional solenoid valve PV.

In the control circuit 200, the current command detection circuit 20 detects the current command $V_{CMD}$ as a differential voltage. The detected current command is provided to the offset circuit 31 and the current command mode determining device 30. The current command mode determining device 30 determines the current command mode through the current command $V_{CMD}$ input, and provides it to the output circuit 90.

There are preferably three current command modes: a fully closed mode for completely closing the proportional solenoid valve PV, a proportionally open mode for controlling the degree of openness of the valve in proportion to the amount of current, and a fully open mode for completely opening the proportional solenoid valve PV.

The offset circuit 31 receives the current command detected by the current command detection circuit 20 and transmits the current command to the current command adding and limiting circuit 32. The offset circuit 31 further determines if the current command is higher than a predetermined level, and outputs an offset value to the current command adding and limiting circuit 32 if the current command is higher than the predetermined level.

The current command adding and limiting circuit 32 adds the current command and the offset value from the offset circuit 31, and outputs the added value to the PI controller 70. At this time, if the offset value for limiting the current command is input from the offset circuit 31, the current command adding and limiting circuit 32 limits the current command to the predetermined value by outputting the predetermined value to the PI controller 70.

The current detection circuit 60 of has an input terminal connected to the current detection resistor Rs of the main circuitry 100, and detects the current Ip flowing in the proportional solenoid valve PV as a voltage value. The current detection circuit 60 outputs the detected value to the PI controller 70.

The PI controller 70 receives the output signals from both the current command adding and limiting circuit 32 and the second triangular pulse generating circuit 50, and then adds and amplifies these two signals. The added value of these two signals then compared with the output signal of the current detection circuit 60, to form an error signal proportional to the difference between the added signal and the output signal of the detection circuit 60. The output of the PI controller 70 is provided to the pulse width modulation comparator 80.

The output signal of second triangular pulse generating circuit 50 is a triangular pulse wave alternating between a positive maximum value and a negative minimum value, i.e., a peak-to-peak value. This triangular pulse wave reduces a dynamic friction coefficient.

The pulse width modulation comparator 80 receives the output signals of both the PI controller 70 and the first triangular pulse generating circuit 49, and compares them. The output signal of the first triangular pulse generating circuit 40 is a triangular pulse wave alternating between the positive maximum value and the base line value 0. This triangular pulse wave is used to reduce power-consumption. The output signal of the pulse width modulation comparator 80 is similar to a rectangular pulse wave, the pulse width of which is determined according to the output level of the PI controller 70. The output signal of the pulse width modulation comparator 80 is provided to the output circuit 90.

The output circuit 90 receives the output signal of both the current command mode determining device 30 and the pulse width modulation comparator 80. According to a mode determined through the current command mode determining device 30, the output circuit 90 generates a switching signal corresponding to the output signal of the pulse width modulation comparator 80. The generated switching signal is applied to the gate terminal of the PMOS transistor M of the main circuitry 100.

The detailed configuration and operation of the control circuit 100 will now be described with reference to FIGS. 2 to 5. Although a control circuit usually includes a power-supply circuit, for simplicity this aspect of the circuit has not been shown.

Figure 2:
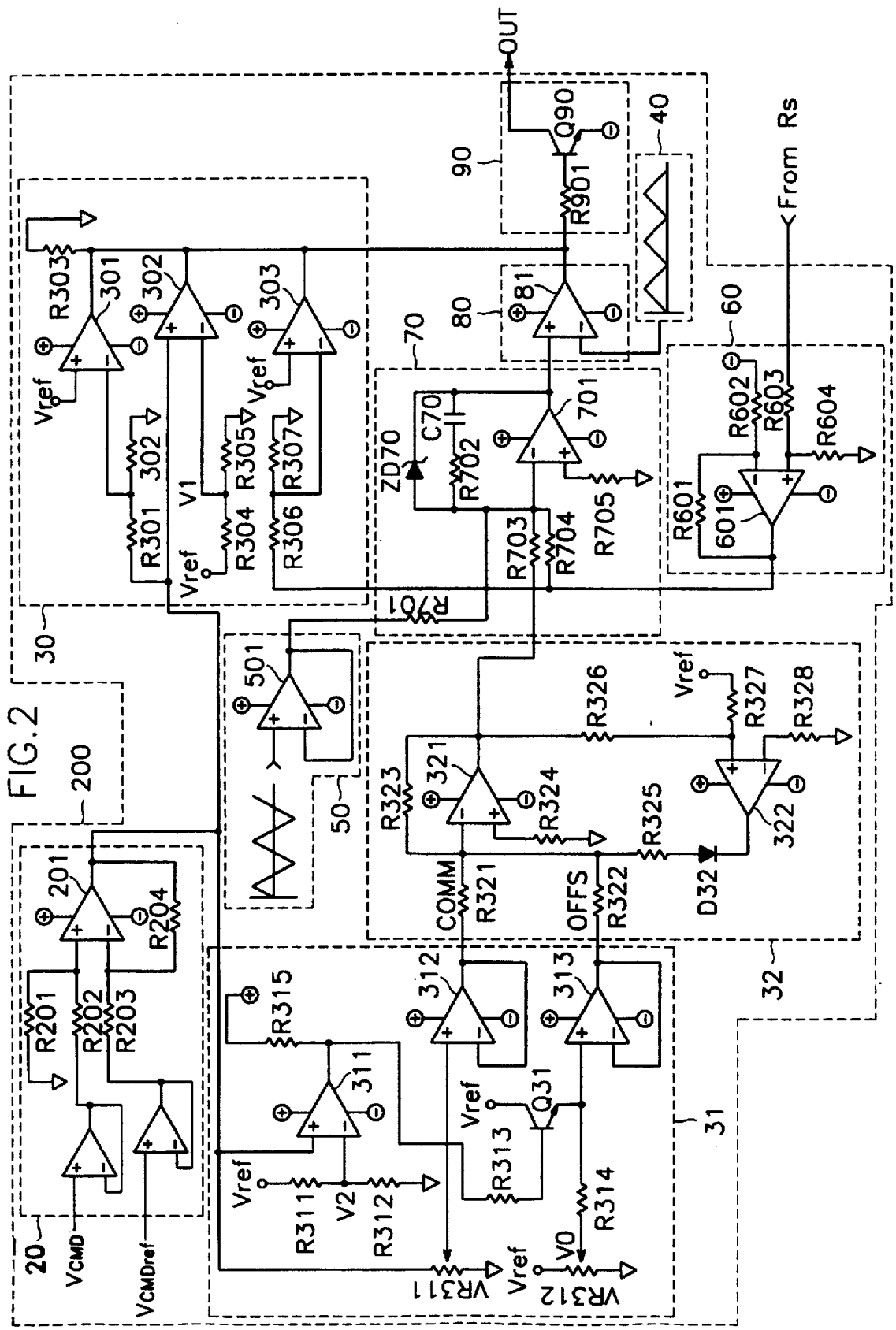
FIG. 2 is a detailed circuit diagram of a control circuit of the proportional solenoid valve control system in accordance with the preferred embodiment of the present invention.

As shown in FIG. 2, the current command detection circuit 20 includes an operational amplifier 201, and resistors R201 to R204 which determine the output voltage of the operational amplifier 201.

The operational amplifier 201 operates as a differential amplifier. The external current command $V_{CMD}$ is input to the noninverting input terminal of the operational amplifier 201, and the internal reference voltage $V_{CMDref}$ is input to the inverting input terminal. The operational amplifier 201 thus noninversely amplifies the current command $V_{CMD}$.

The current command determining device 30 includes an operational amplifier 302 having the output of the current command detection circuit 20 connected to its noninverting input, and an operational amplifier 301 having the output of the current command detection circuit 20 connected to its inverting input. In addition, the current command mode determining device 30 further includes an operational amplifier 303 having the output of the current command detection circuit 20 connected to its inverting input.

A reference voltage $V_{ref}$ is applied to the noninverting input terminal of the operational amplifier 301 and resistors R301 and R302 for dividing the voltage are connected to the inverting input terminal of the amplifier 301.

The inverting input terminal of the amplifier 302 is connected to a contact point between the resistors R301 and R302 which divide the reference voltage $V_{ref}$.

The reference voltage $V_{ref}$ is applied to the noninverting input terminal of the amplifier 303. A contact point between the resistors R306 and R307 for dividing the output voltage is connected to the inverting input terminal of the amplifier 303.

The amplifiers 301, 302, and 303 operate as a comparator. That is, the amplifier 301 compares the voltage of the inverting input terminal with the reference voltage $V_{ref}$ of the noninverting input terminal; the amplifier 302 compares a voltage V1 of the inverting input terminal with the current command of the noninverting input terminal; and the amplifier 303 compares the output of the current detection circuit 60 connected to its inverting input terminal with a voltage of the noninverting input terminal. The output signals of the amplifiers 301, 302, and 303 are added together at a node, and are provided to the output circuit 90.

The offset circuit 31 includes an operational amplifier 311 having its noninverting input connected to the output signal of the current command detection circuit 20, an operational amplifier 312 has its noninverting input connected to the output signal of the current command detection circuit 20 through a variable resistor VR311, and an operational amplifier 313 having its noninverting input connected to the output of the amplifier 311 through a transistor Q31.

The inverting input terminal of the amplifier 311 is connected to a contact point between the resistors R311 and R312 to divide the reference voltage $V_{ref}$. The resistor R313 and a base of a transistor Q31 are connected to the output terminal of the amplifier 311.

Since the inverting input terminal, which is connected to the variable resistor VR 312, and the output terminal of the amplifier 312 are connected together, the amplifier 312 operates as a voltage follower. The output terminal of the amplifier 312 is further connected to the current command adding and limiting circuit 32.

The amplifier 311 operates as a comparator. If the output of the current command detection circuit 20 is larger than a voltage V2 of the inverting input terminal of the amplifier 311, the amplifier 311 outputs a high level signal which turns on the transistor Q31.

The amplifier 312 outputs the output signal of the current command detection circuit 20 passing through the variable resistor VR311 to the current command adding and limiting circuit 32 as a COMM-command.

The amplifier 313 outputs a voltage V0 determined by the variable resistor VR312 to the current command adding and limiting circuit 32 as an offset value OFFS, during a turn-off time of the transistor Q31. If a transistor Q31 is turned on, the amplifier 313 outputs a reference voltage $V_{ref}$ to the current command adding and limiting circuit 32 as an offset value OFFS.

Figure 3:
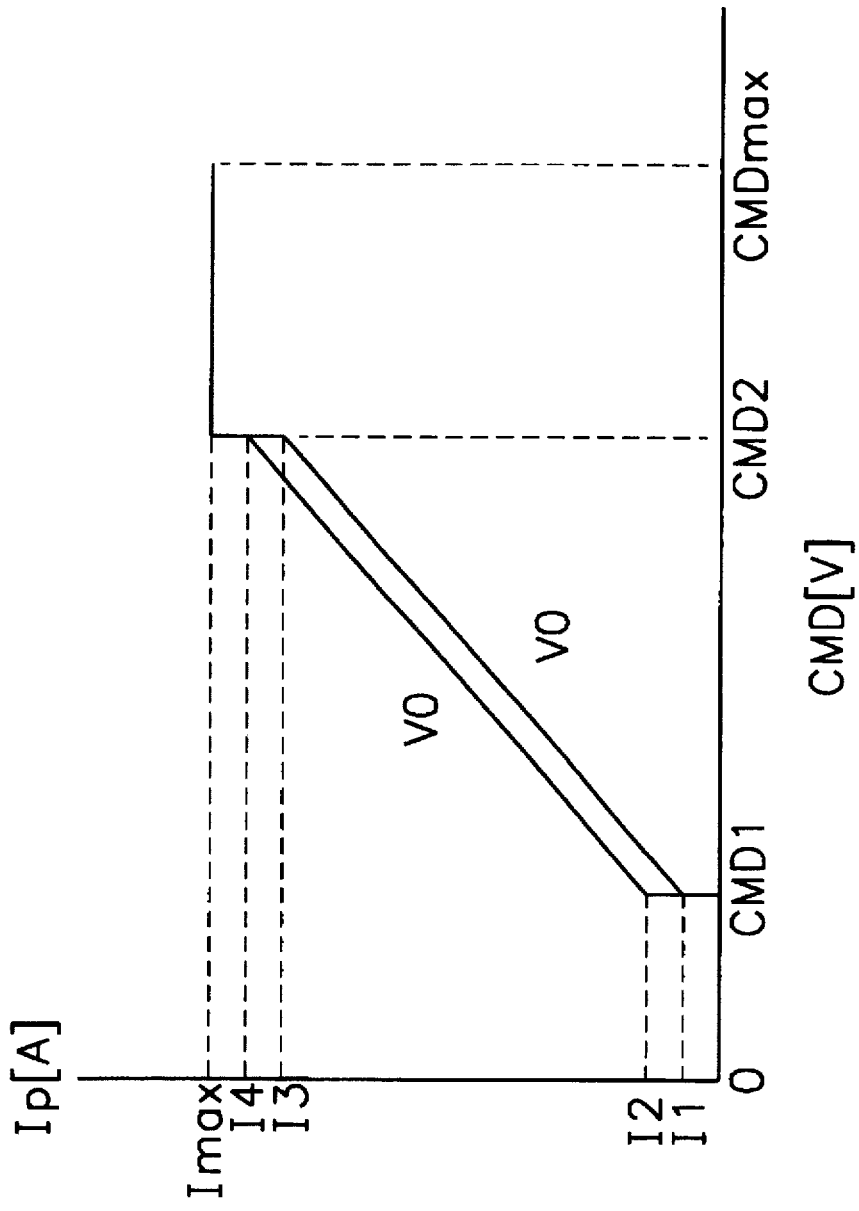
FIGS. 3 to 5 are graphs of load current versus current command regarding the proportional solenoid valve control system in accordance with the preferred embodiment of the present invention.

A user dan control the offset value through the variable resistor VR312. As shown in FIG. 3, the load current Ip corresponding to the current command $V_{CMD}$ can be varied by controlling the offset value.

The current command adding and limiting circuit 32 includes an operational amplifier 321 having its inverting input terminal connected to the command signal COMM and the offset output OFFS from the offset circuit 31. An operational amplifier 322 is also included which has its output terminal connected to a diode D32 and its noninverting input terminal connected to the output terminal of the amplifier 321. The resistors R321 to R328 and the reference voltage $V_{ref}$ cause the amplifier 321 to operate as an adder, and cause the amplifier 322 to operate as a comparator.

The amplifier 321 operates as a adder for adding the signal input to its inverting terminal. If any signal connected to the inverting terminal of the amplifier 321 is higher than a predetermined level, the diode D32 is turned on so that the voltage input to the amplifier 321 is limited.

That is, when the voltage of the inverting terminal of the amplifier 321 is larger than that of the output terminal, the diode D32 is turned on, so that the inverting terminal of the amplifier 321 applies the output voltage of the amplifier 322. The output signal of the amplifier 321 is provided to the PI controller 70.

Figure 4:
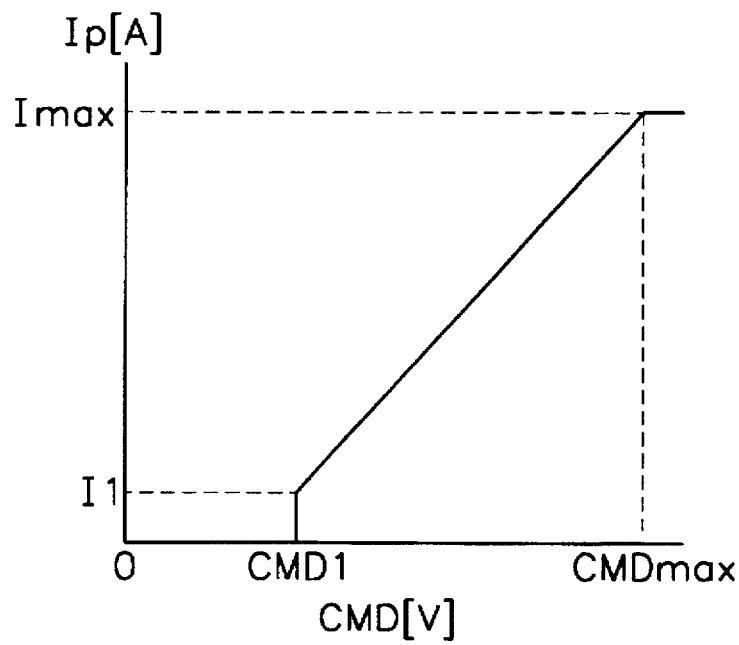
Figure 5:
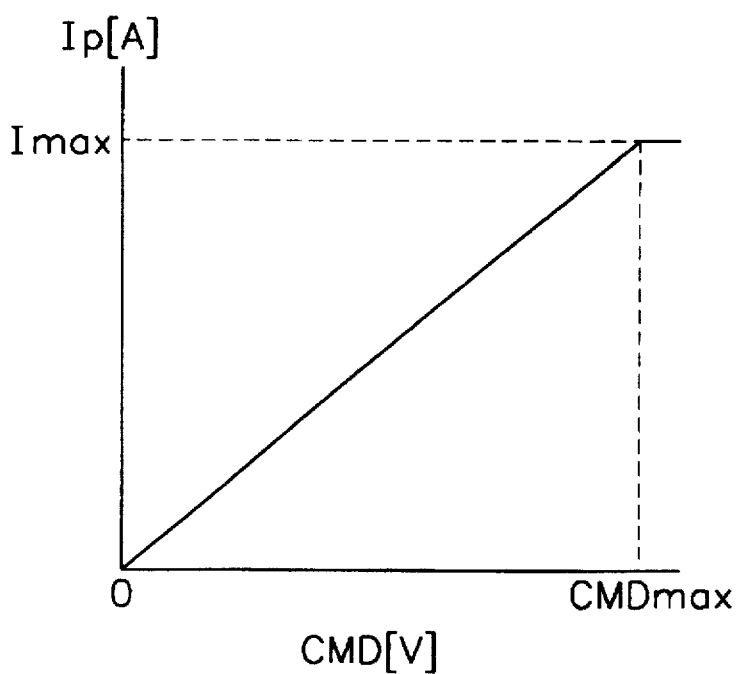

FIGS. 3 to 5 are graphs of load current Ip versus current command $V_{CMD}$, which illustrate the variation of the load current Ip corresponding to voltages V0, V1, and V2 of both the current Command mode determining device 30 and the offset circuit 31.

FIG. 3 shows the load current Ip, when a voltage V1 of the current command mode determining device 30 is CMD1 and a voltage V2 of the offset circuit 31 is CMD2. FIG. 4 shows the load current Ip, when the voltage V1 of the current command mode determining device 30 is CMD1 and the voltage V2 of the offset circuit 31 is CMDmax. FIG. 5 shows the load current Ip, when the voltage V1 of the current command mode determining device 30 is zero and the voltage V2 of the offset circuit 31 is CMDmax.

Referring to FIGS. 3 to 5, the load current Ip can be controlled by adjusting the voltages V0, V1, and V2 of both the current command mode determining device 30 and the offset circuit 31. The voltages V0 to V2 can be controlled by varying each resistance of a variable VR132 and the two pairs of resistors R306 and R307, R311 and R312.

Referring again to FIG. 2, the current detection circuit 60 includes an operational amplifier 601 having its noninverting terminal connected to the current detection resistor Rs of the main circuitry 100, and resistors R601 to R604 which cause the amplifier 601 to operate as a noninverting amplifier.

The amplifier 601 detects a current flowing in the current detection resistor Rs, amplifies (noninversely) the input signal, and outputs this signal to the PI controller 70.

The PI controller 70 includes an operational amplifier 701 having its inverting terminal connected to the output signals from the current detection circuit 60, the current command adding and limiting circuit 32 and the second triangular pulse generating circuit 50. The PI controller 70 also includes resistors R701 to R705 which cause the amplifier 701 to operate as an adder, and a capacitor C70 for eliminating an alternating current component (AC component), which is connected between the inverting terminal and the output terminal of the amplifier 701.

The amplifier 601 of the current detection circuit 60 noninversely amplifies the input signal, and the amplifier 321 of the current command adding and limiting circuit 32 inversely amplifies the input signal. The amplifier 701, operating as an adder, adds the output signal of the current command adding and limiting circuit 32 to the output signal of the current detection circuit 60, so that an error between the two output signals is detected. This error between the current command $V_{CMD}$ and the actual load current Ip is compensated by other circuits connected at the output of the PI controller 70, so that the load current Ip is constantly maintained according to the current command. The output signal of the amplifier 701 is provided to the pulse width modulation circuit 80.

The output signal of the second triangular pulse generating circuit 50 is a triangular pulse wave alternating between a positive peak value and a negative peak value, i.e., a peak-to-peak value. Such triangular pulse wave provides a vibration to an on/off operation of a valve to reduce a dynamic friction coefficient.

The pulse width modulation comparator 80 includes an operational amplifier 81 having its noninverting terminal connected to the output signal of the PI controller 70, and having its inverting terminal connected to the output signal of the first triangular pulse generating circuit 40.

The amplifier 81 operates as a comparator to compare the voltage applied to the noninverting terminal of the amplifier 81 with the triangular pulse provided from the first triangular pulse wave generating circuit 40, which alternates between a positive peak value and a negative peak value.

Accordingly, the output signal of the amplifier 81 is similar to a rectangular pulse wave, the pulse width of which is inversely proportional to a voltage level applied to the noninverting terminal of the amplifier 81. The pulse signal of the amplifier 81 is provided to the output circuit 90.

The output circuit 90 includes a transistor Q90 having its base terminal connected to a node between the output signal of the current command mode determining device 30 and the output signal of the pulse width modulation comparator 80. The emitter terminal of the transistor Q90 is connected to a negative power supply and the collector terminal is connected to the main circuitry 100.

The transistor Q90 is operated by the pulse applied to the base terminal thereof, and is turned on by the positive voltage as a pulse. When the transistor Q90 is turned on, the negative power is provided to the gate terminal of the transistor M of the main circuitry 100 through a gate terminal of the transistor Q90. The transistor M is turned on by a negative gate voltage, and applies a supply voltage $V_{dc}$ to a valve PV.

Thus, the on/off timing and operation of the transistor Q90 are determined by the output signal from the pulse width modulation comparator 80. Additionally, the on/off duty ratio of the transistor Q90 is equal to that of the transistor M, which determines the load current Ip.

As described above, a proportional solenoid valve control system is applicable to a hydraulic circuit for controlling a one-way valve, which is able to precisely control the load current flowing through the proportional solenoid valve according to a current command.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A proportional solenoid valve control system for controlling a current in a proportional solenoid valve, comprising:

a current command detection circuit for detecting a differential voltage between an input voltage and a reference voltage and generating a current command output signal;

an offset circuit which receives said current command output signal from said current command detection circuit, and generates an offset signal according to an offset value which can be varied by user;

a current command limiting circuit which receives said current command output signal and said offset signal, and generates a limited output current which is set to a fixed value when said offset signal is larger than said current command output signal and is set to be equal to said current command output signal when said offset signal is not larger than said current command output signal;

a current detection circuit for detecting the current flowing in the proportional solenoid valve and generates a solenoid current signal responsive to the detected current;

a proportional integrator controller which receives a first triangular pulse signal alternating between a positive value and a negative value, said limited output current and said solenoid current signal and forms an error signal;

a pulse width modulation comparator which receives and compares a second triangular pulse signal and said error signal to form a pulse width output signal; and an output circuit which generates a switching signal having a duty ratio corresponding to said pulse width output signal.

2. The proportional solenoid valve control system as defined in claim 1, further comprising:

a current command mode determining circuit connected between said current command detection circuit and said output circuit, which determines an operating mode of said current command output signal, and provides said operating mode to said output circuit.

3. The proportional solenoid valve control system as defined in claim 2, wherein said current command mode determining circuit is arranged to determine one of three modes, said three modes including: a fully closed mode for completely closing a proportional solenoid valve, a proportionally open mode for controlling a degree of openness of said proportional solenoid valve in proportion to a current quantity, and a fully open mode for completely opening said proportional solenoid valve.

4. The proportional solenoid valve control system as defined in claim 1, wherein said current command detection circuit includes an operational amplifier to amplify the differential voltage between said input voltage and the reference voltage which are input from outside.

5. The proportional solenoid valve control system as defined in claim 1, wherein said offset circuit comprises:

a first operational amplifier operated as a voltage follower, for transferring said current command output signal from said current command detection circuit to said current command limiting circuit;

a second operational amplifier which compares said current command output signal from said current command detection circuit with a predetermined reference voltage, and generating a high level signal when said current command is larger than said predetermined reference voltage;

a third operational amplifier which is operated as a voltage follower to provide said offset signal to said current command limiting circuit; and a transistor connected between said first operational amplifier and said third operational amplifier, for applying a predetermined offset value to limit said current command output signal to said current command limiting circuit.

6. The proportional solenoid valve control system as defined in claim 1, wherein said current command limiting circuit comprises:

a first operational amplifier operated as a adder to add said current command output signal and said offset signal which are output from said offset circuit;

a second operational amplifier which compares an output signal of said first operational amplifier with a predetermined reference voltage, and applies an output signal to an inverting terminal of said first operational amplifier; and a diode connected between said inverting terminal of said first operational amplifier and the output terminal of said second operational amplifier with a forward bias, for applying an output signal of said second operational amplifier to said inverting terminal of said first operational amplifier when a voltage of said inverting terminal of said first operational amplifier is larger than that of said output terminal of said second operational amplifier.

7. The proportional solenoid valve control system as defined in claim 6, wherein:

said first operational amplifier inversely amplifies a signal input to said first operational amplifier and simultaneously adds said voltage of said inverting terminal of said first operational amplifier.

8. The proportional solenoid valve control system as defined in claim 1, wherein said current detection circuit comprises:

an operational amplifier which amplifies a load current detected by a current detection resistor sensing current flowing through a proportional resistor, and provides an output signal to said proportional integrator controller.

9. The proportional solenoid valve control system as defined in claim 1, wherein said proportional integrator controller comprises an operational amplifier for adding said solenoid current signal, said limited output current and said first triangular pulse signal.

10. The proportional solenoid valve control system as defined in claim 4, wherein said offset circuit comprises:

a first operational amplifier operated as a voltage follower, for transferring said current command output signal from said current command detection circuit to said current command limiting circuit;

a second operational amplifier which compares said current command output signal from said current command detection circuit with a predetermined reference voltage, and generates a high level signal when said current command is larger than said predetermined reference voltage;

a third operational amplifier which is operated as a voltage follower to provide said offset signal to said current command limiting circuit; and a transistor connected between said first operational amplifier and said third operational amplifier, for applying a predetermined offset value to limit said current command output signal to said current command limiting circuit.

11. A proportional solenoid valve control system for controlling a current in a proportional solenoid valve, comprising:

a proportional valve;

a current detection circuit which detects a current flowing in said proportional solenoid valve and generates a solenoid current signal;

a proportional integrator controller which receives a first triangular pulse signal alternating between a positive value and a negative value and said solenoid current signal and forms an error signal;

a pulse width modulation comparator which receives and compares a second triangular pulse signal and said error signal to form a pulse width output signal; and an output circuit which generates a switching signal having a duty ratio corresponding to said pulse width output signal to control said proportional valve.

12. The proportional solenoid valve control system of claim 11, wherein:

said proportional integrator controller further receives a current command output signal corresponding to a current command to be applied to said proportional valve and uses said current command output signal to form said error signal.

13. The proportional solenoid valve control system of claim 12, wherein:

said current command output signal is set according to a differential voltage between an input voltage and a reference voltage.

14. The proportional solenoid valve control system of claim 12, wherein:

said current command output signal is set to be the smaller of itself or an offset value which can be varied by user.

* * * * *